United States Patent
Hoshino et al.

(10) Patent No.: US 9,816,252 B2
(45) Date of Patent: Nov. 14, 2017

(54) HYDRAULIC WORK MACHINE

(71) Applicant: Hitachi Construction Machinery Co., Ltd., Tokyo (JP)

(72) Inventors: Masatoshi Hoshino, Tsuchiura (JP); Shinji Ishihara, Hitachinaka (JP); Kazuo Fujishima, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 210 days.

(21) Appl. No.: 14/411,246

(22) PCT Filed: May 10, 2013

(86) PCT No.: PCT/JP2013/063206
§ 371 (c)(1),
(2) Date: Dec. 24, 2014

(87) PCT Pub. No.: WO2014/002622
PCT Pub. Date: Jan. 3, 2014

(65) Prior Publication Data
US 2015/0225927 A1 Aug. 13, 2015

(30) Foreign Application Priority Data
Jun. 29, 2012 (JP) .................................. 2012-147833

(51) Int. Cl.
*E02F 9/20* (2006.01)
*F02D 29/02* (2006.01)
(Continued)

(52) U.S. Cl.
CPC ............ *E02F 9/2075* (2013.01); *B60K 6/485* (2013.01); *B60W 10/06* (2013.01); *B60W 10/08* (2013.01);
(Continued)

(58) Field of Classification Search
None
See application file for complete search history.

(56) References Cited

U.S. PATENT DOCUMENTS 8,726,664 B2\* 5/2014 Narazaki ............... E02F 9/2235
60/701
2004/0222000 A1\* 11/2004 Ohtsukasa ............ E02F 9/2075
172/2
(Continued)

FOREIGN PATENT DOCUMENTS

EP 2 314 848 A1 4/2011
JP 2002-275945 9/2002
(Continued)

OTHER PUBLICATIONS

Mechanical translation of JP2003-028071, Jan. 29, 2003.\*
Extended European Search Report issued in counterpart European Application No. 13809757.1 dated Apr. 28, 2016 (ten (10) pages).

*Primary Examiner* — Jerrah Edwards
*Assistant Examiner* — Donald J Wallace
(74) *Attorney, Agent, or Firm* — Crowell & Moring LLP

(57) ABSTRACT

This invention is a hydraulic work machine having an electric assist motor coupled to an engine and a hydraulic pump, in the hydraulic work machine of which, a rotational speed and torque of the engine are controlled so that an operating point of the engine moves along a predetermined route for yielding a combustion state of the engine under a transient state that the engine changes in speed and torque. A target speed and torque of the engine 7 are set so that the rotational speed and torque of the engine 7 will change along a predetermined route F in a running region of the engine, respective rates of change of the target rotational speed and torque of the engine 7 are limited, and the engine 7 is
(Continued)

controlled to yield the target engine speed. In addition, torque of the assist motor 10 is controlled to yield the target torque of the engine.

7 Claims, 13 Drawing Sheets

(51) Int. Cl.
*F02D 29/04* (2006.01)
*E02F 9/22* (2006.01)
*B60K 6/485* (2007.10)
*B60W 10/06* (2006.01)
*B60W 10/08* (2006.01)
*B60W 10/30* (2006.01)
*B60W 20/00* (2016.01)

(52) U.S. Cl.
CPC ............ *B60W 10/30* (2013.01); *B60W 20/00* (2013.01); *E02F 9/2246* (2013.01); *E02F 9/2296* (2013.01); *F02D 29/02* (2013.01); *F02D 29/04* (2013.01); *B60W 2300/17* (2013.01); *Y02T 10/6226* (2013.01); *Y02T 10/6286* (2013.01)

(56) References Cited

U.S. PATENT DOCUMENTS

| | | | |
|---|---|---|---|
| 2009/0037061 A1* | 2/2009 | Tabata | B60K 6/445 |
| | | | 701/55 |
| 2009/0320461 A1 | 12/2009 | Morinaga et al. | |
| 2011/0098873 A1* | 4/2011 | Koga | E02F 9/123 |
| | | | 701/22 |
| 2012/0086220 A1 | 4/2012 | Abdel-Baqi et al. | |
| 2013/0197768 A1* | 8/2013 | Imura | B60W 10/06 |
| | | | 701/50 |

FOREIGN PATENT DOCUMENTS

| | | | | |
|---|---|---|---|---|
| JP | 2003-028071 | 1/2003 | | |
| JP | 2004-100621 | 4/2004 | | |
| JP | WO 2012032909 A1 * | 3/2012 | ............ | B60W 10/06 |
| WO | 2009/157511 A1 | 12/2009 | | |

* cited by examiner

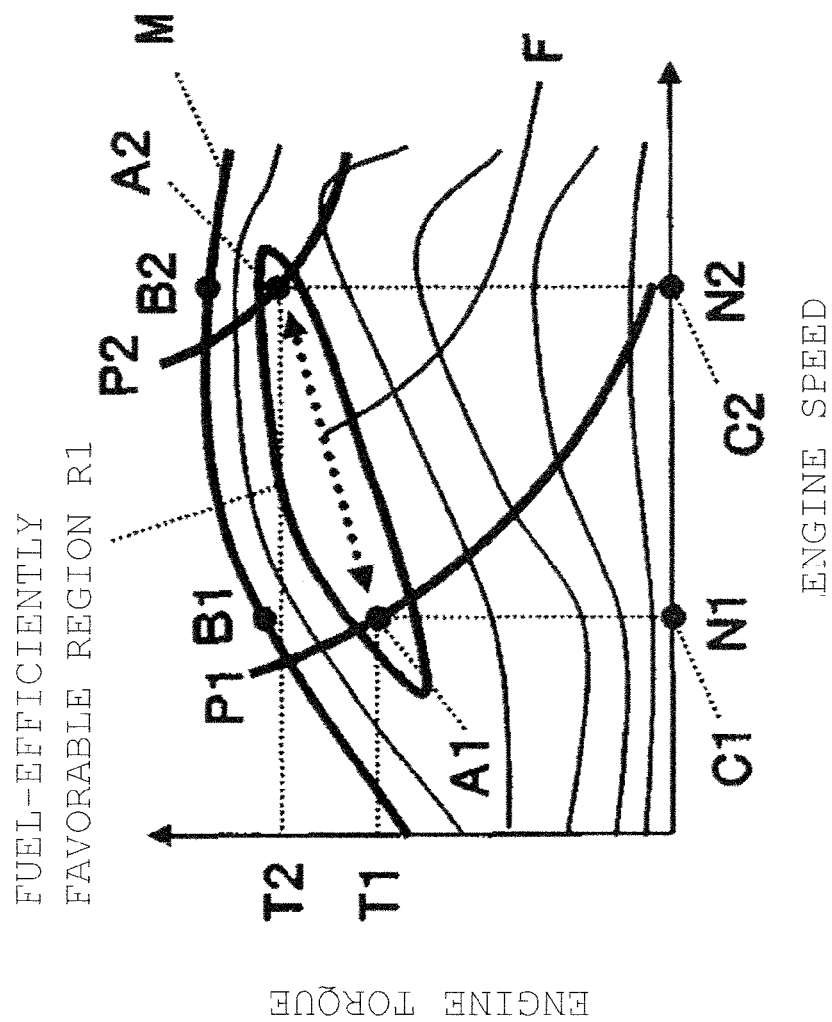

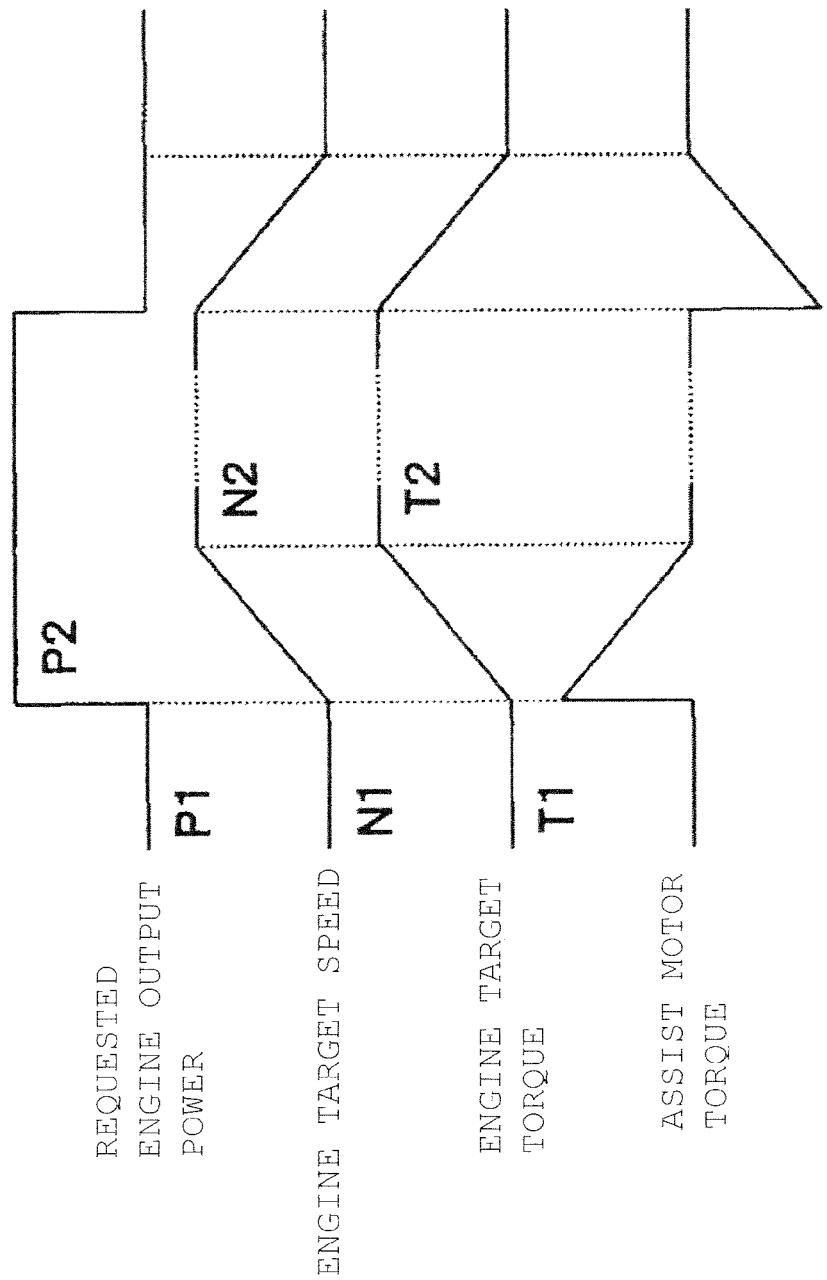

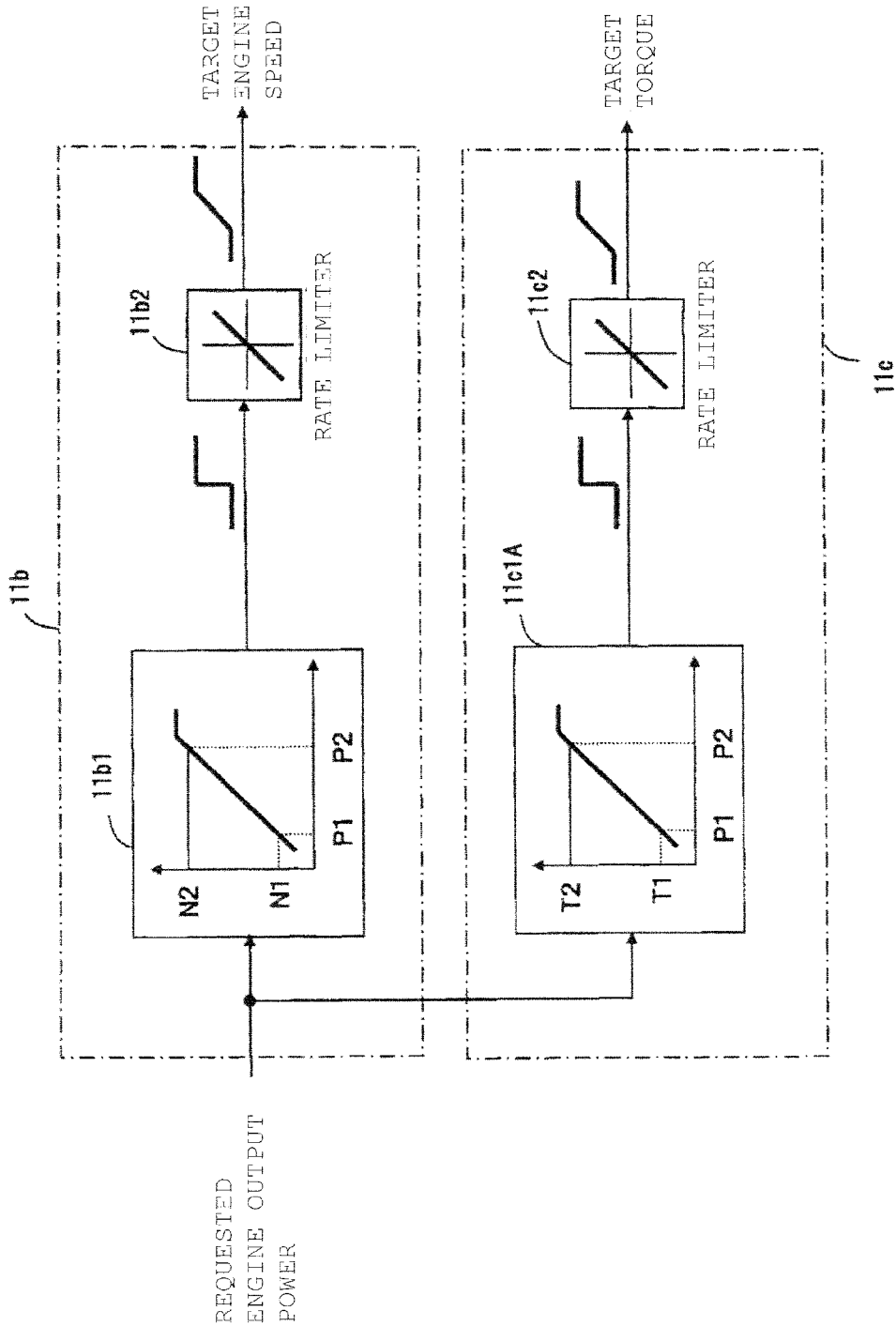

HYDRAULIC WORK MACHINE

TECHNICAL FIELD

The present invention relates generally to hydraulic excavators and other hydraulic work machines, and more particularly, to a hybrid-driven hydraulic work machine having an electric assist motor driven by an electricity storage device as well as an engine.

BACKGROUND ART

In recent years, regulations relating to gas emissions from the engines of hydraulic work machines such as hydraulic excavators have been more tightened with each passing year. Market needs for improved fuel economy are also becoming stronger with the rising fuel costs and the continuing business recession.

In response to the gas emissions regulations, engine manufacturers and others have made efforts toward the reduction of the particulate matter (PM) and nitrogen oxides (NOx) contained in gas emissions, in particular, and techniques for sophisticating combustion control have been developed in large numbers to date. At the same time, technology has also been developed that is intended to collect and purify the above particulate matter (PM) and nitrogen oxides (NOx) by placing a gas emissions aftertreatment device(s) such as a diesel particulate filter (DPF) and a urea SCR (Selective Catalytic Reduction) system, between the engine and muffler of the vehicle. This technology is combined with a combustion control sophistication technique, as appropriate, to meet the increasingly tightened gas emissions regulations.

The gas emissions aftertreatment devices such as DPFs and urea SCR systems, however, usually use complex and expensive materials. For example, the catalysts in DPFs use platinum. Additionally, SCR systems need to have a tank for storage of urea, and a urea injector. Accordingly, engine systems having a gas emissions aftertreatment device(s) are considerably expensive, compared with engine systems not having one. Establishment of a method for reducing PM, NOx, and other regulated gas components from the engine exhaust itself, therefore, is being desired partly for the deletion or simplification of aftertreatment devices.

For improved fuel efficiency, on the other hand, hybrid-driven hydraulic work machines having an electric assist motor driven by a battery or any other elect storage device besides an engine, as driving sources, are being proposed or developed. In the hybrid of this configuration, the output power required for a pump is supplied from the engine not only independently, but also with the assist motor. Traditionally, engine torque has been determined according to a particular output of a hydraulic pump. Use of an electric assist motor, however, allows a desired engine torque value to be set, which is to say, an operating point of the engine that is represented by the engine speed and torque can be set at a fuel-efficiently favorable position.

For example, the construction machine proposed as a hydraulic work machine in Patent Document 1 includes an electric motor driven by an engine and is designed to save energy by storing excess engine output power as electrical energy, and then when the engine output power is insufficient, releasing the stored electrical energy and driving the electric motor to maintain the necessary torque absorbed by a pump. According to Patent Document 1, with this machine configuration, a compact engine that generates rated output power equivalent to average horsepower needed for the construction machine to perform work can be adopted for improved fuel economy and reduced CO2 emissions.

The working machine proposed in FIG. 6 of Patent Document 2 is constructed to generate an oil pressure by driving a hydraulic pump via an engine and an electric motor. This working machine employs a control method that includes setting an Increase rate of the engine output power as a predetermined value, then comparing a maximum achievable value of the engine output power that is calculated from the predetermined value of the increase rate, with an output power requirement calculated from the hydraulic output power required for the hydraulic pump, and if the calculated output power requirement exceeds the maximum achievable value of the engine output power, compensating for this excess output power with output power of the motor. According to Patent Document 2, with this machine configuration, even if a hydraulic load abruptly increases, a decrease in combustion efficiency, occurrence of particulate matter, and a stoppage of the engine can be avoided since operating conditions of the engine can be maintained in an adequate range by controlling the engine load so as to avoid its abrupt increase.

PRIOR ART DOCUMENTS

Patent Documents

Patent Document 1: Japanese Patent No. 4512283
Patent Document 2: Japanese Patent No. 4633813

SUMMARY OF THE INVENTION

Problems to be Solved by the Invention

In hydraulic excavators and other hydraulic working machines, changes in the hydraulic pump load required during work excavation ara sharp and very significant, with the result that the engine load, unlike that of an automobile or the like, instantaneously changes to nearly 0 to 100 percent of the rated engine torque. These changes in engine load substantially mean that the operating point of the engine, represented by the engine speed and torque, moves rapidly and changes in a wide range.

In the meantime, the engine injects an appropriate amount of fuel according to the torque required, and in order to reduce emission levels of the air-polluting particulate matter (PM) and nitrogen oxides (NOx) contained in exhaust gases, controls the amounts of injected fuel, intake air, and exhaust gases to be subjected to EGR for recirculation into an air intake line. At this time, under steady-state operation, during which the engine speed and torque are constant, the above control quantities can be stabilized and maintained at their optimum levels, the emissions of the particulate matter (PM) and nitrogen oxides (NOx) can be controlled to considerably low levels, which in turn improves fuel efficiency. Conversely under a transient state, during which the engine speed and torque vary, it is difficult to accurately predict a response of the control quantities and optimize each of the control quantities in different timing while the engine speed and torque are changing. Because of a difference in nature from combustion under considerably optimized steady-state operation, combustion under the transient state increases the emissions of the particulate matter PM) and nitrogen oxides (NOx), thus degrading fuel efficiency as well.

To cope with these problems, following schemes are conceivable: expanding a DPF capacity or a urea storage tank capacity; causing a DPF to elevate exhaust gas temperature by injecting an extra amount of fuel, thereby shortening an interval at which to perform regenerative control for forcible combustion of PM deposits; or causing a urea SCR to conduct finer control of urea injection in accordance with particular fuel-injecting conditions of the engine. However, these schemes will lead to increasing costs and further degrading fuel efficiency.

In any case, sharper and more significant changes in engine load are considered to be more disadvantageous for exhaust and fuel efficiency.

In a hybrid configuration with a hydraulic pump driven by both an engine and an electric assist motor, the engine coordinates with the assist motor, instead of operating independently, to accommodate any sharp and significant changes in the hydraulic pump load required. This coordination enables relatively easy alleviation of changes in engine load.

Patent Document 1 describes a scheme in which engine torque leveling is achieved using the assist motor selectively according to situation. In this scheme, if the torque that a hydraulic pump requests is greater than a predetermined torque of the engine, the assist motor assists the engine in generating and delivering a driving force, and if the requested torque is smaller than the engine torque, the assist motor is used as an electrical generator. After leveling in this scheme, as shown in FIG. 2 of Patent Document 1, an operating point is estimated to always stay near a rated output point Pa of the compact engine, regardless of the magnitude of the work load.

In consideration of the diverse operations to which the construction machine is applied, however, the rated output point Pa is not easy to fix at one position. For example, if heavy-duty work is continued, the assist motor will consume the stored power within an electricity storage device while assisting the engine, and finally the pump is liable to fail to develop the output power needed for the work. Conversely if light-duty work is continued, although generated power is stored into the electricity storage device, the engine cannot maintain the rated output point Pa after full charging. An electricity storage device of a larger capacity is needed to solve these problems. In addition, an electric assist motor capable of generating output power at least nearly half as much the maximum load assumed, is needed to level out the engine loads in practically all kinds of work to the rated output point Pa. Costs increase in both cases. Before these devices can be placed in practical use, the operating point of the engine needs appropriate moving according to the particular work load in order to avoid a situation under which strong assistance and the generation of electricity need to be continued over a long time.

Patent Document 2 proposes a method designed to prevent the engine output power from exceeding its predetermined rate of increase, and in case of an abrupt increase in the output power that the hydraulic pump requests, compensate for a shortage in output power with the output power of the assist motor. This method allows the increase rate of the engine output power to be reduced and is therefore effective to a certain extent for reducing gas emissions and improving fuel economy. However, the method does not allow desirable rates of change of the engine speed and torque to be set for reducing gas emissions and improving fuel economy, and hence the operating point represented by the engine speed and torque, and its moving route, to be defined. In addition, since Patent Document 2 offers no description of preventives or countermeasures against a decrease in engine output, the effectiveness of the proposed method is considered to be insufficient in terms of reducing gas emissions and improving fuel economy.

A first object of the present invention is to provide a hybrid-driven hydraulic work machine having an electric assist motor coupled to an engine and a hydraulic pump, the hydraulic work machine being adapted to control a rotational speed and torque of the engine so that an operating point of the engine moves along a predetermined route, and thereby to improve a combustion state of the engine during a transient state under which the engine changes in speed and torque.

A second object of the present invention is to provide a hybrid-driven hydraulic work machine having an electric assist motor coupled to an engine and a hydraulic pump, the hydraulic work machine being adapted to control a rotational speed and torque of the engine so that an operating point of the engine moves along a predetermined route at a predetermined rate, and thereby to improve a combustion state of the engine during a transient state under which the engine changes in speed and torque.

Means for Solving the Problems (1) To attain the above first object, a hybrid-driven hydraulic work machine according to an aspect of the present invention includes an engine, a hydraulic pump rotationally driven by the engine, an electric assist motor coupled to the engine and the hydraulic pump, a plurality of actuators each driven by a hydraulic fluid delivered from the hydraulic pump, and a plurality of operating devices each including an operating member and configured to output an appropriate operating signal according to particular operation of the operating member, thereby operating the actuators. The hydraulic work machine further includes: an engine speed and torque setter that sets a target rotational speed and target torque for the engine so that in response to a change in a work load of the hydraulic work machine, a rotational speed and torque of the engine will change along a predetermined route that yields a favorable combustion state of the engine, the predetermined route being defined in a running region of the engine that is determined from the rotational speed and torque of the engine; a first control device that controls the engine so as to obtain the target engine speed set by the engine speed and torque setter; and a second control device that controls torque of the assist motor so as to obtain the target torque set by the engine speed and torque setter.

In this way, when the operating point of the engine is to be moved by changing the rotational speed and torque of the engine, since the target rotational speed and target torque for the engine can be set so that the rotational speed and torque of the engine will change along the predetermined route, the operating point of the engine can be prevented from passing through a fuel-efficiently unfavorable region or a region of a high air-pollutant content in gas emissions while moving, and thus the combustion state of the engine under the transient state with the changing engine speed and torque can be improved.

(2) To attain the above second object, the engine sped and torque setter in the hybrid-driven hydraulic work machine outlined in item (1) above is further configured to limit respective rates of change of the target rotational speed and target torque of the engine so that when the work load of the hydraulic work machine changes, the target rotational speed and target torque of the engine will change at a rate lower than a rate at which an output of the hydraulic pump changes in response to the work load of the hydraulic work machine, and so that respective rates of change of the rotational speed and torque of the engine are controlled to fall within a predetermined range for yielding a favorable combustion state of the engine.

In this way, when the operating point of the engine is to be moved by changing the rotational speed and torque of the engine, since not only the target rotational speed and target torque of the engine are set so as to change the rotational speed and torque of the engine along the predetermined route, but also the respective rates of change of the target rotational speed and target torque of the engine are limited, these characteristics prevent the operating point from moving too fast and degrading fuel efficiency, and emissions of air pollutants from increasing, and leads to improved engine internal combustion under the transient state that the engine changes in speed and torque.

(3) In the hybrid-driven hydraulic work machine outlined in item (1) or (2) above, the engine speed and torque setter preferably includes: a first computing unit that, in response to the change in the work load of the hydraulic work machine, computes the target rotational speed and target torque of the engine as values present on the predetermined route; and a second computing unit that limits respective rates of change of the target rotational speed and target torque of the engine so that when the work load of the hydraulic work machine changes, the rotational speed and torque of the engine will change along the predetermined route.

(4) In addition, in the hybrid-driven hydraulic work machine outlined in item (3) above, the first computing unit includes an arithmetic map configured to describe the predetermined route in associated form with respect to at least one of a relationship between the engine output requested and the target speed of the engine and a relationship between the engine output requested and the target torque of the engine, and compute at least one of the target rotational speed and target torque of the engine with reference to the requested engine output corresponding to the work load of the hydraulic work machine.

(5) Furthermore, in the hybrid-driven hydraulic work machine outlined in item (3) above, the second computing unit includes a first rate limiter that suppresses the rate of change of the target engine speed computed by the first computing unit, to a predetermined limit value or less; and a second rate limiter suppresses the rate of change of the target engine torque computed by the first computing unit, to a predetermined limit value or less; wherein a ratio between the predetermined limit value for the rate of change of the target engine speed and the predetermined limit value for the rate of change of the target engine torque is set so that the rotational speed and torque of the engine will change along the predetermined route.

(6) Furthermore, in the hybrid-driven hydraulic work machine outlined in item above, the predetermined limit value for the rate of change of the target engine speed and the predetermined limit value for the rate of change of the target engine torque are set so that the respective rates of change of the rotational speed and torque of the engine are controlled to fall within a predetermined range for yielding the favorable combustion of the engine.

(7) Moreover, in the hybrid-driven hydraulic work machine outlined in any one of items (1) to (6) above, the predetermined route is either a route determined in accordance with fuel efficiency characteristics of the engine, or a route determined allowing for the fuel efficiency characteristics of the engine and in accordance with emission characteristics of air pollutants contained in gas emissions from the engine.

(8) in the by hybrid-driven hydraulic work machine outlined in item (5) or (6) above, the limit value for the rate of change of the target engine speed and the limit value for the rate of change of the target engine torque are each at least one of a value determined in accordance with fuel efficiency characteristics of the engine, and a value determined allowing for the fuel efficiency characteristics of the engine and in accordance with emission characteristics of air pollutants contained in gas emissions from the engine.

Effects of the Invention

In the present invention, when the operating point of the engine is to be moved by changing the rotational speed and torque of the engine, since the target rotational speed and target torque of the engine can be set so as to change the rotational speed and torque of the engine along the predetermined route, this characteristic prevents the operating point of the engine from passing through a fuel-efficiently unfavorable region or a region of a high air-pollutant content in gas emissions while moving, and thus improves the combustion state of the engine under the transient state with the changing engine speed and torque.

Additionally in the present invention, when the operating point of the engine is to be moved by changing the rotational speed and torque of the engine, since not only the target rotational speed and target torque of the engine are set so as to change the rotational speed and torque of the engine along the predetermined route, but also the respective rates of change of the target engine speed and torque are limited, these characteristics prevent the operating point from moving too fast and degrading fuel efficiency, and emissions of air pollutants from increasing, and leads to improved engine internal combustion under the transient state that the engine changes in speed and torque.

BRIEF DESCRIPTION OF THE DRAWINGS

FIG. 6 is a map that shows fuel efficiency characteristics of the engine with respect to a rotational speed and torque, the figure also being a conceptual diagram illustrating a basic idea of the present invention.

FIG. 7 is a timing chart that represents movements of an operating point between points A1 and A2 in a fuel-efficiently favorable region.

FIG. 8B is a diagram similar to FIG. 8A, showing another example of an engine torque setter.

MODES FOR CARRYING OUT THE INVENTION

Hereunder, embodiments of the present invention will be described with reference to the accompanying drawings.
(First Embodiment)

Figure 1:
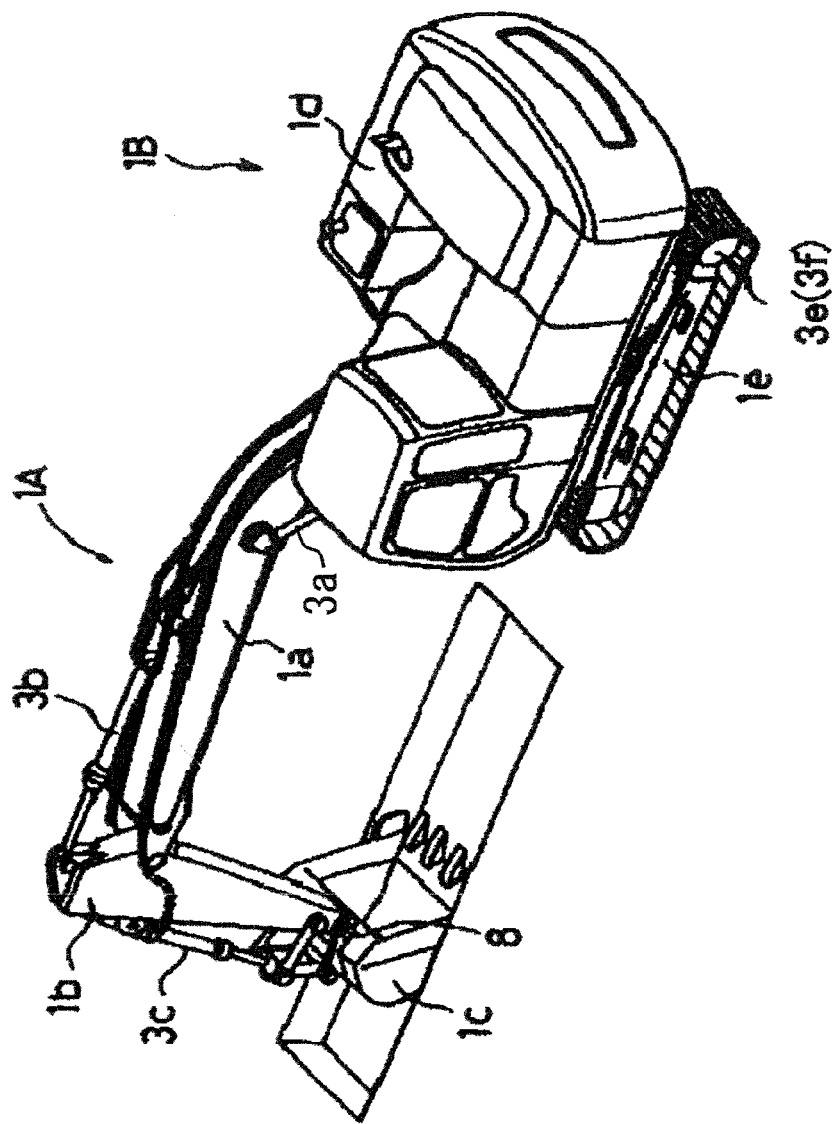
FIG. 1 is an external view of a hydraulic excavator (hydraulic work machine) according to a first embodiment of the present invention.

FIG. 1 is an external view of a hydraulic excavator, an example of a hydraulic work machine according to a first embodiment of the present invention.

The hydraulic excavator includes an articulated type of front implement 1A having a boom 1a, an arm 1b, and a bucket 1c, each constructed to pivot in a vertical direction, and a vehicle body 1B having an upper swing structure 1d and a lower traveling structure 1e. The boom 1a of the front implement 1A has a proximal end supported at a front portion of the upper swing structure 1d so as to be pivotable in the vertical direction. The boom 1a, the arm 1b, the bucket 1c, the upper swing structure 1d, and the lower travel structure 1e are driven by a boom cylinder 3a, an arm cylinder 3b, a bucket cylinder 3c, a swing motor 16 shown in FIG. 2, and left and right traveling motors 3e and 3f, respectively. Operation of the boom 1a, arm 1b, bucket 1c, and upper swing structure 1d, is specified by hydraulic actuating signals (control pilot pressures) applied from control lever devices 4a and 4b (see FIG. 2), and operation of the lower travel g structure 1e is specified by hydraulic actuating signals (control pilot pressures) applied from a traveling pedal device not shown.

Figure 2:
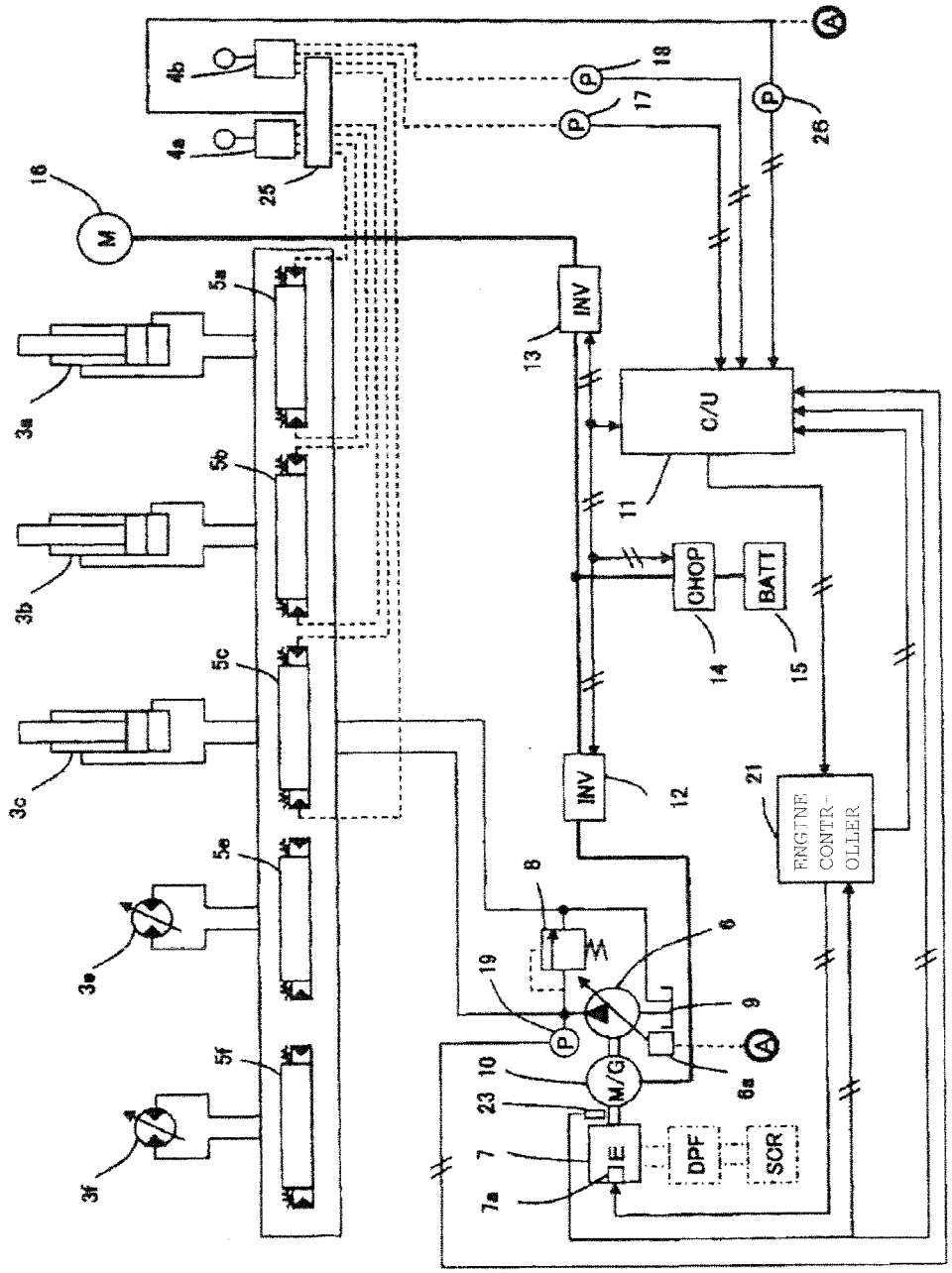
FIG. 2 is a configuration diagram of an actuator driving control system mounted on the hydraulic excavator.

FIG. 2 is a configuration diagram of an actuator driving control system mounted on the hydraulic excavator of FIG. 1 in the first embodiment of the present invention.

Referring to FIG. 2, in addition to the control lever devices 4a, 4b and the traveling pedal device not shown, the actuator driving control system in the first embodiment of the present invention includes spool-type hydraulic directional control valves 5a to 5c, 5e, 5f, a main hydraulic pump 6, an engine 7, a main relief valve 8, a tank 9, and a shuttle valve block 25.

The control lever devices 4a, 4b and the traveling pedal device each generate a hydraulic actuating signal (control pilot pressure) by reducing a primary pressure that has been generated by delivery of a hydraulic fluid from a pilot pump not shown, to a secondary pressure according to particular opening angles of reducer valves (remote control valves) connected to the control lever devices 4a, 4b and the traveling pedal device. The pilot control pressure is sent to pressure receiving sections of the directional control valves 5a-5c, 5e, 5f, to switch each of these control valves from a neutral position shown in figure. Each directional control valve 5a-5c, 5e, 5f is, for example, an open center type of spool valve disposed on a center bypass line, and when switched by the control pilot pressure, the valve controls a flow (direction and flow rate) of the fluid which has been delivered from the hydraulic pump 6, and controls the driving of the hydraulic actuators 3a-3c, 3e, 3f. The hydraulic pump 6 is rotationally driven by the engine r. If an internal pressure of a hydraulic line into which the delivered fluid from the hydraulic pump 6 is introduced increases to a certain extent, the relief valve 8 vents the fluid into the tank 9, hence preventing an excessive increase in the internal pressure of the hydraulic line.

The shuttle valve block 25 selectively outputs a hydraulic actuating signal having the highest pressure, among all the hydraulic actuating signals (control pilot pressures) generated by the control lever devices 4a, 4b, other than the hydraulic actuating signal specifying a swinging operation, and among all the hydraulic actuating signals generated by the traveling pedal device not shown.

The hydraulic pump 6 is a variable-displacement pump, having a regulator 6a of a positive control scheme, and a hydraulic actuating signal that the shuttle valve block 25 outputs is guided to the regulator 6a. As known, the regulator 6a of the positive control scheme increases a delivery flow rate of the fluid within the hydraulic pump 6 by increasing a swash plate tilting angle (capacity) of the pump 6 as the hydraulic actuating signal level rises with increases in the amounts of actuation of (i.e., requested flow rates of the fluid in) control levers and pedal, which are control and operating members of the control lever devices 4a, 4b and the traveling pedal device.

The regulator 6a may be of a negative control scheme that increases the titling angle (capacity) of the hydraulic pump 6 as the pressure of the input signal to the regulator 6a decreases. In this case, a flow restrictor is disposed at a downstream endmost section of the center bypass line extending through the directional control valves 5a-5c, 5e, 5f to the tank 9, and an inlet pressure of the restrictor is input as the signal pressure to the regulator 6a. When the restrictor is disposed at the downstream endmost section of the bypass line, as the control levers and pedal that are the control and operating members of the control lever devices 4a, 4b and the traveling pedal device increase in the amounts of actuation (i.e., requested flow rates of the fluid), a flow of the fluid through the restrictor on the center bypass line connected to the directional control valves 5a-5c, 5e, 5f decreases and the inlet pressure of the restrictor correspondingly decreases. The inlet pressure of the restrictor is therefore input as the signal pressure to the regulator 6a, and as this signal pressure decreases, the hydraulic pump 6 increases in tilting angle (capacity). This enables the delivery flow rate of the fluid within the hydraulic pump 6 to be increased as the amounts of actuation' of the control and operating members increase.

The directional control valves 5a-5c, 5e, 5f may be spool valves of a closed type, and the regulator 6a may be of a load-sensing control type that controls a fluid delivery pressure the hydraulic pump 6 to become higher than a maximum load pressure by a predetermined pressure level.

In addition, the regulator 6a has a torque control function that as known, reduces the tilting angle (capacity) of the hydraulic pump 6 as the fluid delivery pressure of the pump 6 increases, and thus a torque that the hydraulic pump 6 absorbs is controlled not to exceed a predetermined maximum level.

The engine 7, on its exhaust line, can include a DPF and/or urea SCR system known as an exhaust gas purifier(s).

The actuator driving control system in the present embodiment also includes an electric assist motor 10, a vehicle body controller 11, inverters 12, 13, a chopper 14, a battery 15, pressure sensors 17, 18 for detecting the hydraulic actuating signals for swing use, a pressure sensor 26 for detecting the hydraulic actuating signal that the shuttle valve block 25 outputs, a pressure sensor 19 for detecting the fluid delivery pressure of the hydraulic pump 6, a speed sensor 23 for detecting a rotational speed of the engine 7, and an engine controller 21.

The assist motor 10 is coupled between the hydraulic pump 6 and the engine 7. The assist motor 10 has a function of a generator that converts output power of the engine 7 into electrical energy (power) and outputs the electrical energy to the inverter 12, and a function of a motor that conducts assist driving of the hydraulic pump 6 by being driven by the electrical energy (power) supplied from the inverter 12.

When the assist motor 10 functions as a generator, the inverter 12 converts alternating-current (AC) power that the assist motor 10 has generated, into direct-current (DC) power and then outputs the DC power, and when the assist motor 10 functions as a motor, the inverter 12 converts DC power supplied from the battery 15, into AC power and then supplies the AC power to the assist motor 10.

The inverter 13 converts the DC power that has been generated by the assist motor 10 and output from the inverter 12, into AC form and then supplies the AC power to the swing motor 16. The inverter 13 also converts AC power that the swing motor 16 has regenerated as a generator during swing braking, into DC power and then outputs the DC power.

The battery 15 controls voltage via the chopper 14 and supplies power to the inverters 12, 13. The battery 15 also stores the electrical energy that the assist motor 10 has generated, and the electrical energy supplied from the swing motor 16.

The engine controller 21 first computes a deviation of a target engine speed value sent from the vehicle body controller 11, relative to an actual rotational speed of the engine 7 that the speed sensor 23 outputs. Next, the engine controller 21 computes a target fuel injection quantity on the basis of the engine speed deviation, and then outputs a corresponding control signal to an electronic governor 7a disposed on the engine 7. The electronic governor 7a is activated by the control signal to inject the amount of fuel that is equivalent to the target fuel injection quantity, into the engine 7.

The vehicle body controller 11 has a control and arithmetic circuit, in which circuit the controller 11 conducts the following kinds of control relating to the engine 7, the assist motor 10, and the swing motor 16.

(1) Driving Control of the Swing Motor 16

Each pressure sensor 17, 18 is connected to a pilot line that guides a hydraulic actuating signal indicating a rightward/leftward swinging operation, among all hydraulic actuating signals generated by the control lever device 4b, and detects the hydraulic actuating signal. The vehicle body controller 11 receives an electrical detection signal from the pressure sensor 17, 18 and controls the driving of the swing motor 16 in accordance with the detected hydraulic actuating signal. More specifically, if the detected hydraulic actuating signal is for indicating the leftward swinging operation, the vehicle body controller 11 controls the inverter 12 in accordance with the particular hydraulic actuating signal and conducts electricity-generating control for operating the assist motor 10 as a generator. Additionally, the vehicle body controller 11 controls the inverter 13 and conducts power-running control for driving the swing motor 16. The swing motor 16 then operates to swing the upper swing structure 1d to the left at a speed corresponding to the hydraulic actuating signal. Conversely if the above-detected hydraulic actuating signal is for indicating the rightward swinging operation, the vehicle body controller 11 controls the inverter 12 in accordance with the particular hydraulic actuating signal and conducts the electricity-generating control for operating the assist motor 10 as a generator. Additionally, the vehicle body controller 11 controls the inverter 13 and conducts the power-running control for driving the swing motor 16. The swing motor 16 then operates to swing the upper swing structure 1d to the right at a speed in accordance with the hydraulic actuating signal.

(2) Storage Control for Recovered Power

During swing braking, the vehicle body controller 11 controls the inverter 13 and conducts the electricity-generating control for operating the assist motor 10 as a generator, and recovers electrical energy from the swing motor 16. The vehicle body controller 11 also conducts electricity storage control so that the recovered electrical energy is stored into the battery 15.

(3) Control of the Assist Motor 10 (Electricity Storage Management and Control of the Battery 15)

When a hydraulic load upon the hydraulic pump 6 (i.e. the torque absorbed by the pump) is light and the amount of electricity left in the battery 15 is small, the vehicle body controller 11 controls the inverter 12 and conducts the electricity-generating control for operating the assist motor 10 as a generator to generate excess power. The vehicle body controller 11 further conducts electricity storage control so that the generated excess power is stored into the battery 15. Conversely when the hydraulic load of the hydraulic pump 6 (i.e., the torque absorbed by the pump) is heavy and the amount of electricity left in the battery 15 is equal to or greater than a predetermined value, the vehicle body controller 11 controls the inverter 12 and conducts power-running control for supplying power to the battery 15 and operating the assist motor 10 as a motor to assist the driving of the hydraulic pump 6.

(4) Engine Speed and Torque Control (Feature of the Present Invention)

The vehicle body controller 11 computes the target speed and target torque of the engine 7 according to the hydraulic load acting upon the hydraulic pump 6 (i.e., a work load of the hydraulic excavator), and outputs a control signal to the engine controller 21 and the inverter 12. The hydraulic load of the hydraulic pump 6 is a pump output computed by multiplying the fluid delivery pressure that the pressure sensor 19 has detected, and the flow rate computed from the hydraulic pressure signal that the pressure sensor 26 has detected. When the pump output is small, the vehicle body controller 11 reduces the target speed and target torque of the engine for improved fuel efficiency or reduced air-pollutant emissions. When the pump output is large, the vehicle body controller 11 increases the target speed and target torque of the engine for sufficient engine output power.

Figure 3:
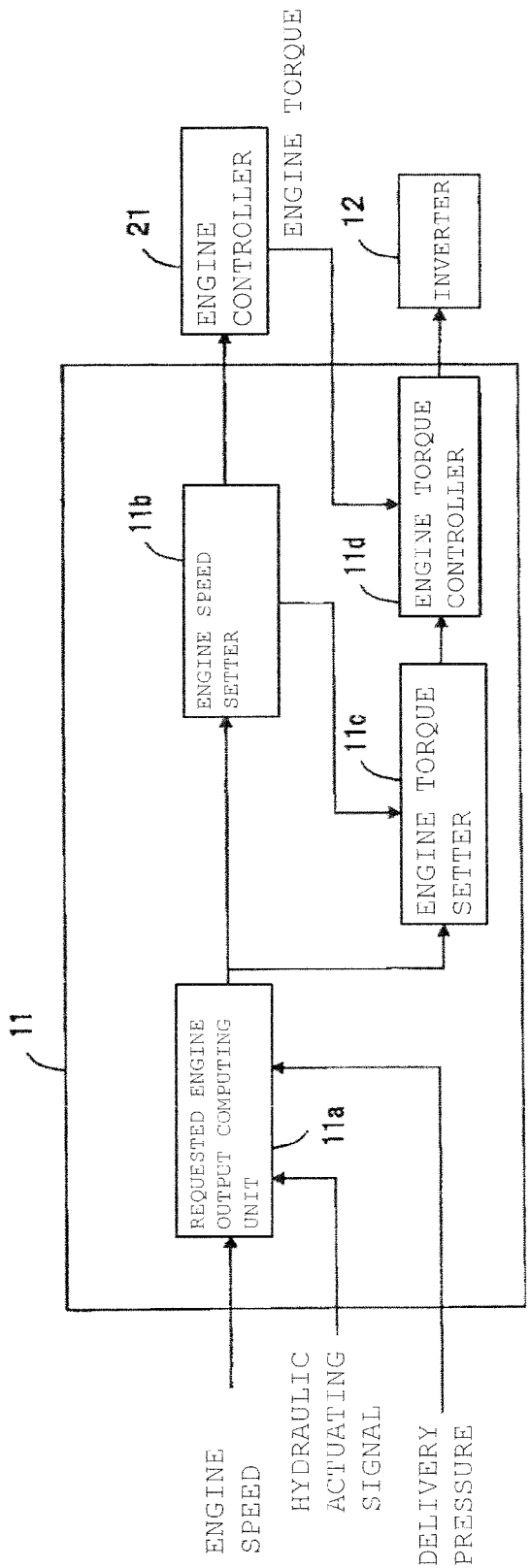
FIG. 3 is a functional block diagram that shows details of engine speed and torque control in a vehicle body controller.

FIG. 3 is a functional block diagram that shows details of the control by the vehicle body controller 11, described in item (4) above.

The vehicle body controller 11 includes a requested engine output computing unit 11a, an engine speed setter 11b, an engine torque setter 11c, and an engine torque control unit 11d. The requested engine output computing unit 11a estimates requested engine output power from the speed of the engine 7 measured by the speed sensor 23, the hydraulic actuating signal detected by the pressure sensor 26, and the fluid delivery pressure of the hydraulic pump 6, detected by the pressure sensor 19. The engine speed setter 11b computes the target engine speed from the output power required for the engine 7, and outputs the computed speed value to the engine controller 21. The engine controller 21 computes the target fuel injection quantity so that the engine 7 will rotate at the target engine speed, and out is the corresponding control signal to the electronic governor the engine torque setter 11c computes the target torque of the engine 7 from the target engine speed and the output power required for the engine 7. The engine torque control unit 11d uses the torque of the engine 7 that the engine controller 21 outputs, and the target torque of the engine 7, to compute a torque that the assist motor 10 should generate for matching the engine torque and the target torque, and drive the inverter 12 in accordance with the computed torque.

The requested engine output computing unit 11a, the engine speed setter 11b, and the engine torque setter 11c also constitute an engine speed and torque setting device that sets the target speed and target torque of the engine 7 so that in response to a change in the work load of the hydraulic excavator (hydraulic work machine), the engine speed and torque will change along a predetermined route for improved engine internal combustion, defined in a running region of the engine 7 that is determined from the engine speed and torque. The engine controller 21 constitutes a first control device that controls the engine 7 so as to obtain the target engine speed set by the engine speed and torque setting device, and the engine torque control unit 11d constitutes a second control device that controls torque of the assist motor 10 so as to obtain the target torque set by the engine speed and torque setting device.

In addition, the engine speed setter 11b (the engine speed and torque setting device) limits respective rates of change of the target speed and target torque of the engine 7 so that when the work load of the hydraulic excavator changes, the target speed and target torque of the engine 7 will change at a rate lower than that at which an output of the hydraulic pump will change according to the particular change in the work load of the hydraulic excavator, and so that the respective rates of change of the target engine speed and torque are controlled to fall within a predetermined range for improved combustion in the engine.

In the present embodiment, the predetermined route F for improved combustion in the engine 7 is determined from fuel efficiency characteristics of the engine 7. Thus, a fuel-efficiently favorable route is set as the route F denoted by a dotted line between points A1 and A2 in a region R of FIG. 6. In the present embodiment, predetermined limit values for the rate of change of the target engine speed and the rate of change of the target engine torque are also determined from the fuel efficiency characteristics of the engine 7. Accordingly, the respective rates of change of the target engine speed and torque are limited to fall within the predetermined range for improved combustion in the engine 7.

The following describes details of the requested engine output computing unit 11a, the engine speed setter 11b, the engine torque setter 11c, and the engine torque control unit 11d.

Figure 4:
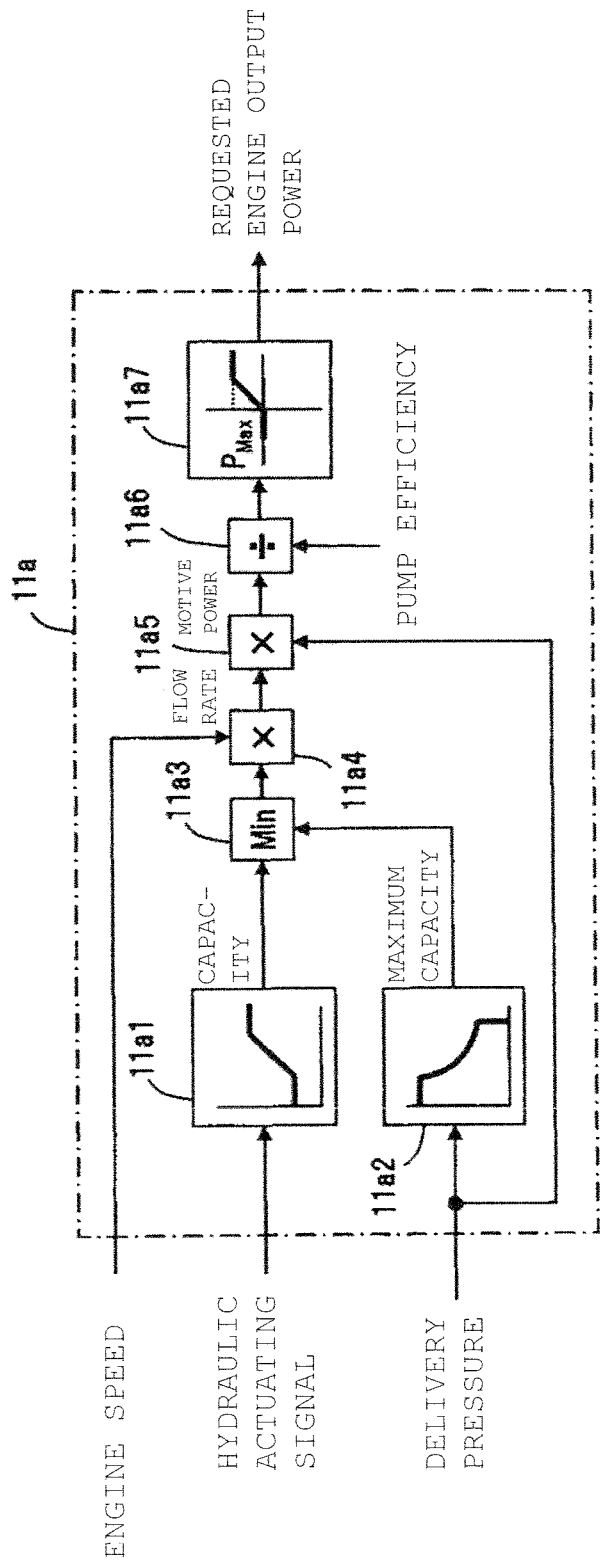
FIG. 4 is a block diagram that shows details of computation in a requested engine output computing unit.

FIG. 4 is a block diagram that shows details of the computation by the requested engine output computing unit 11a. The requested engine output computing unit 11a computes the output power required of the engine 7, from a hydraulic actuating signal and the delivery pressure of the hydraulic fluid. The requested engine output computing unit 11a uses a map 11a1, which describes the relationship between the hydraulic actuating signal and capacity (tilting angle) of the hydraulic pump 6, to estimate a capacity of the hydraulic pump 6 from the hydraulic actuating signal. The hydraulic pump 6 has a torque limiting function as described above, and the requested engine output computing unit 11a computes a maximum capacity of the hydraulic pump 6 from the delivery pressure in accordance with characteristics of the torque limiting function that are described in the map 11a2. The requested engine output computing unit 11a additionally uses a minimum value selector 11a3 to select a smaller capacity from computation results based upon the map 11a1 and the map 11a2, and thus obtain the capacity estimated of the hydraulic pump 6. A multiplier 11a4 multiplies the estimated capacity by the engine speed and thus calculates a flow rate of the fluid delivered from the hydraulic pump 6, and further multiplies the calculated flow rate by the delivery pressure and thus estimates the output (motive power or horsepower) that the hydraulic pump 6 develops. Furthermore, a divider 11a6 divides the output by pump efficiency and adopts a result of this division as the output power that will be requested for the engine 7. A map 11a7 is used at this time to prevent the requested engine output power from exceeding maximum output power that the engine 7 can deliver.

Figure 5:
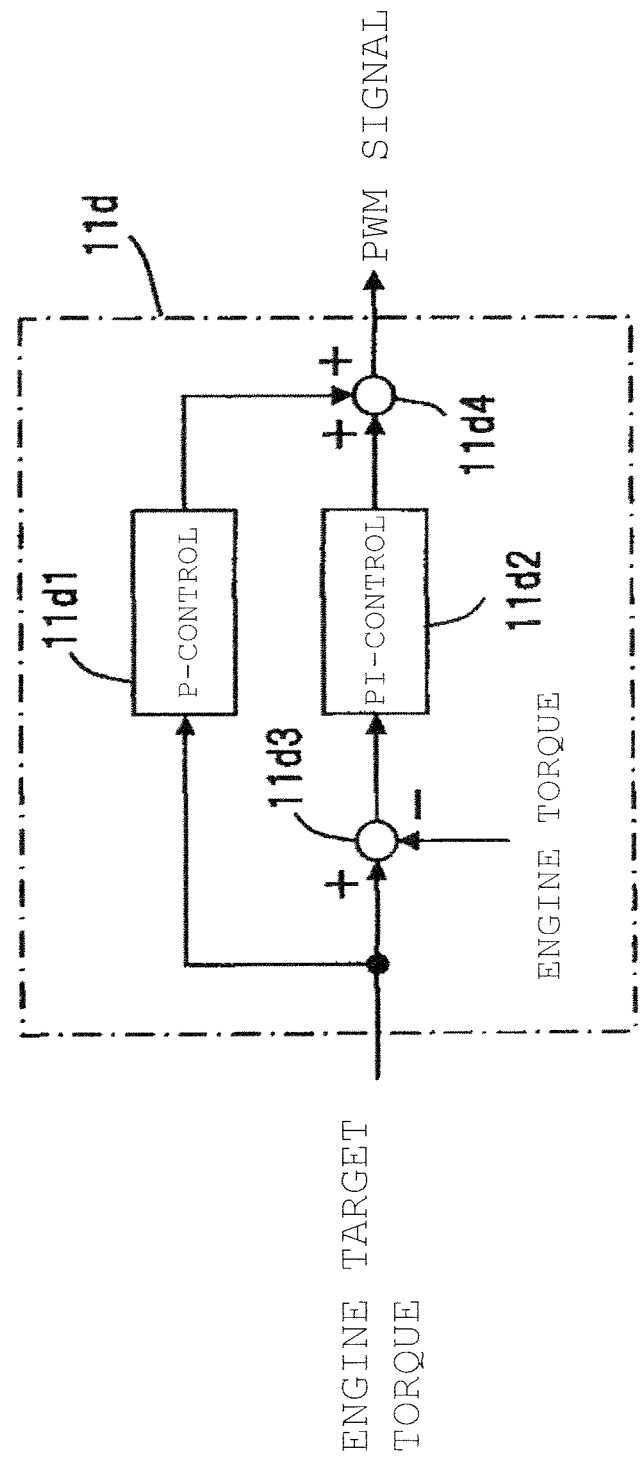
FIG. 5 is a block diagram showing an example of an engine torque control unit.

FIG. 5 is a block diagram showing an example of the engine torque control unit 11d. The engine torque control unit 11d activates a subtractor 11d3 to calculate a deviation of an actual engine torque relative to a target engine torque and activates a PI-controller 11d2 to conduct PI-control computations including an integral computation so as to match the torque of the engine 7 to the target torque. To ensure an appropriate torque response, the engine torque control unit 11d also activates a P-controller 11d1 to conduct a proportional control computations, then activates an adder 11d4 to combine results of the PI-control computations and those of the P-control computations, and outputs a PWM signal as the computation results to the inverter 12. This provides power-running control or electricity-generating control of the assist motor 10.

Next, the engine speed setter 11b and the engine torque setter 11c are described in detail below.

FIG. 6 is a map that shows fuel efficiency characteristics of the engine 7 with respect to a rotational speed and torque, the figure also being a conceptual diagram illustrating a basic idea of the present invention.

Referring to FIG. 6, reference symbol M denotes a maximum torque line for the engine 7, with an inner region of the maximum torque line M being a running region determined from the engine speed and torque. In addition, a plurality of curves drawn inside the running region are fuel efficiency contour lines, an inner region of the fuel efficiency contour lines, that is, a region to which reference symbol R1 is assigned, is a fuel-efficiently favorable region, and a dotted line drawn between points A1 and A2 in a central section of the region denotes a route F representing a most fuel-efficiently favorable region. Iso-horsepower curves P1, P2 denoting the requested engine output power are also shown in FIG. 6. The output (horsepower) of the engine 7 is represented by a product of the engine speed and the engine torque, and the iso-horsepower curves P1, P2 are hyperbolic lines.

FIG. 6 indicates that high fuel efficiency is attained in a region of intermediate engine speeds and relatively high torque, and that fuel efficiency gradually degrades in all other regions. Swing operations and other work relatively light in load require the engine 7 output denoted by P1, and excavation and other work relatively heavy in load require the engine 7 output denoted by P2. When the engine 7 is always run at a rotational speed of N2, there is no problem, whether the requested engine output is of a level denoted by P1 or P2. In such a case, if the requested output is of the P2 level, the engine 7 can be run in the most fuel-efficiently favorable region internal to the fuel-efficiently favorable region R1, whereas if the requested output is of the P1 level, fuel efficiency degrades most significantly. Accordingly, in order to run the engine in the fuel-efficiently favorable region R1 as far as possible regardless of the magnitude of the work load, the target engine speed is set to N1 when the P1 level is requested, and the target engine speed is set to N2 when the P2 level is requested. Torque values of the engine 7 in above cases are T1 and T2, and an operating point of the engine 7 that is represented by the engine speed and torque moves between points A1 and A2 as the work load changes. The engine speed and torque during a transient response are managed to ensure that the engine speed and the engine torque vary along the route F, denoted by the dotted line between points A1 and A2 in the fuel-efficiently favorable region R1, to prevent the operating point of the engine 7 from overstepping the fuel-efficiently favorable region R1 even during the movements of the operating point, and that a speed at which the operating point of the engine 7 moves is controlled to fall within a highly fuel-efficient range. Briefly the rates of change of the engine speed and the engine torque are suppressed to stay within the highly fuel-efficient range. This is a basic concept of the present invention.

If the scheme of the present invention is not used and a target engine speed to be imparted to the engine controller 21 is merely increased from N1 to N2, fuel efficiency degrades since engine speed feedback control of the engine controller 21 causes the operating point of the engine 7 to pass through point B1 first and then point B2, along the maximum torque line. Conversely if the target engine speed is reduced from N2 to N1, since the engine speed exceeds the target engine speed, fuel cut, or reduction in a supply rate of the fuel, causes the operating point to pass through point C2 first and then point C1. During the fuel cut, fuel efficiency naturally does not degrade, but after the fuel cut, the output that the hydraulic pump is requesting develops abruptly, which rapidly increases the torque and degrades fuel efficiency.

FIG. 7 is a timing chart that represents the movements of the operating point between points A1 and A2 in the fuel-efficiently favorable region R1. First, suppose that the output required for the engine 7 increases stepwise from P1 to P2. This commonly occurs for excavation and other work that the hydraulic excavator performs. At this time, in response to the increase in the output required for the engine 7 (the requested engine output power), the target engine speed increases from N1 to N2 and the target torque of the engine 7 increases from T1 to T2. Rates of change of these increases are determined so that the route F from point A1 to point A2 extends along the dotted line between points A1 and A2 in the fuel-efficiently favorable region R1 (i.e., the engine speed and the engine torque vary in the region R1, along the route F denoted by the dotted line between fuel-efficiently favorable points A1 and A2) and so that the respective rates of change are controlled to fall within the fuel-efficiency favorable range. At this time, when the assist motor 10 is activated using the control of the engine torque controller 11d in FIGS. 3 and 5, the assist motor 10 does not generate torque during steady-state operation at the output P1, but at substantially the same time that the generation of the requested engine output power is started, the assist motor 10 starts power-running control to assist the engine 7. As the output of the engine 7 increases, the torque of the assist motor 10 decreases and during steady-state operation at the output P2, returns to zero. Substantially a right half of the timing chart shows a case in which the requested engine output power decreases from P2 to P1. In this case, the route F of the operating point as it moves from point A2 to point A1, also extends along the dotted line between fuel-efficiently favorable points A1 and A2, and the target speed and target torque of the engine 7 are changed from N2 to N1 and from T2 to T1, respectively, at predetermined rates of change to avoid an abrupt change in torque.

Figure 8A:
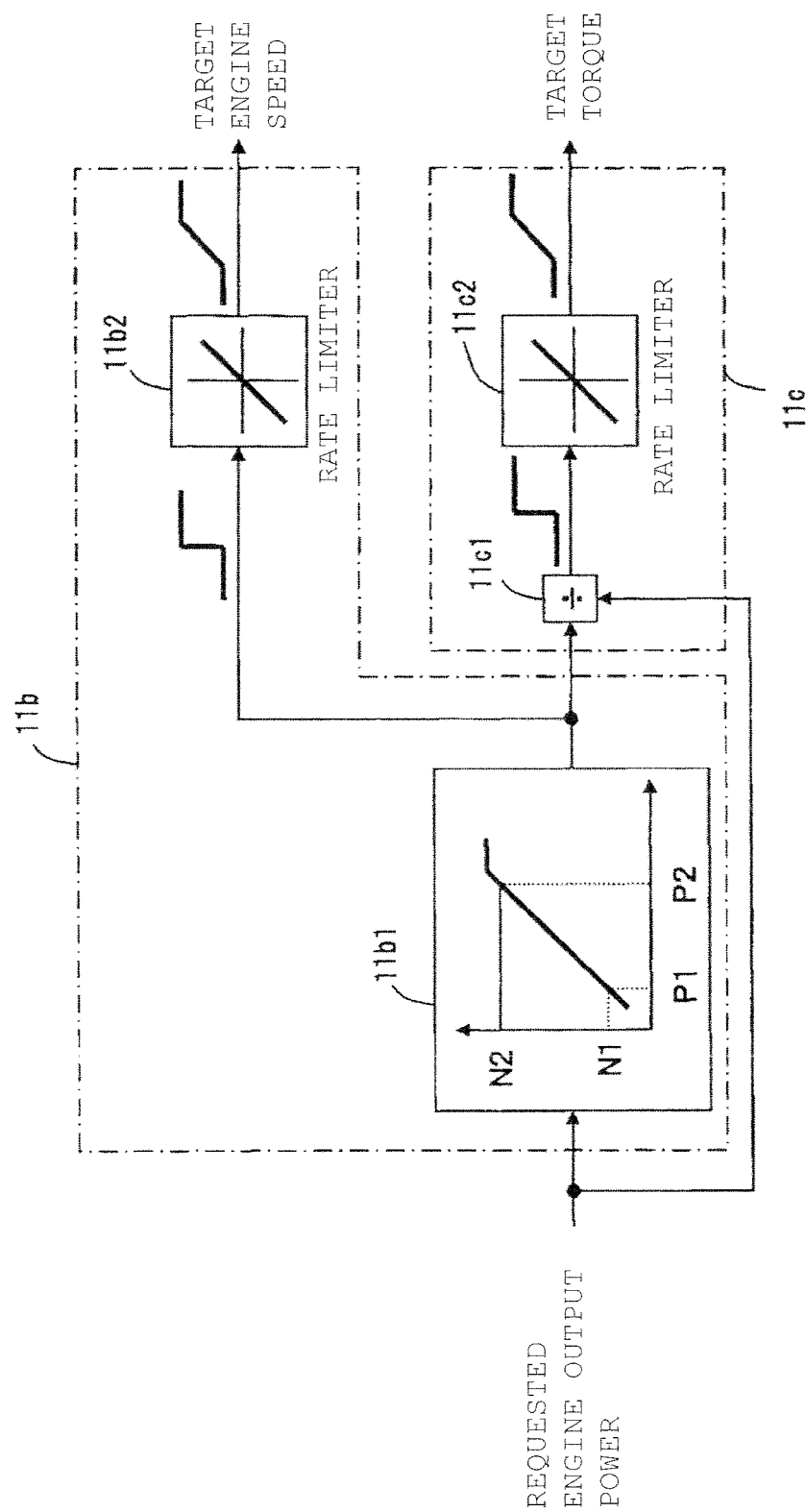
FIG. 8A is a block diagram that shows details of processing in an engine speed setter and an engine torque setter.

FIG. 8A is a block diagram that shows details of processing in the engine speed setter 11b and the engine torque setter 11e.

The engine speed setter 11b includes a target engine speed map 11b1 and a rate limiter 11b2, and the torque setter 11c includes a divider 11c1 and a rate limiter 11c2.

The following first provides a generalized, functional description of elements of the engine speed setter 11b and the engine torque setter 11c.

The target engine speed map 11b1 and the divider 11c1 constitute a first computing block, which in accordance with the work load of the hydraulic excavator (the hydraulic work machine), computes the target rotational speed and target torque of the engine 7 as values present on the predetermined route F for improved combustion in the engine (i.e., the route F denoted by the dotted line between fuel-efficiently favorable points A1 and R2). The rate limiter 11b2 and the rate limiter 11c2 constitute a second computing block that limits the respective rates of change of the target engine speed and the target engine torque so that when the work load of the hydraulic excavator (the hydraulic work machine) changes, the engine speed and torque also change along the predetermined route F drawn as the dotted line between fuel-efficiently favorable points A1 and A2.

The target engine speed map 11b1, the rate limiter 11b2, the divider 11c1, and the rate limiter 11c2 are described in further detail below.

The target engine speed map 11b1 describes the relationship between the requested engine output and the target speed of the engine 7 so that the target speed N and target torque T of the engine 7 are set on the route F defined as the dotted line between fuel-efficiently favorable points A1 and A2 on the fuel efficiency characteristics map of FIG. 6. A most fuel-efficiently favorable target engine speed is output according to the requested engine 7 output.

The target torque can be found by dividing the requested engine output power by the target engine speed that has been determined from the target engine speed map 11b1.

The rate limiters 11b2, 11c2 suppress the rates of change of the target engine speed and the target engine torque to respective predetermined limit values or less when the requested engine 7 output changes abruptly, and then output the target engine speed and the target engine torque.

The respective predetermined limit values to which the rate limiters 11b2, 11c2 limit the rates of change are set so that the speed at which the operating point, represented by the rotational speed and torque of the engine 7, moves along the route F, defined as the dotted line between fuel-efficiently favorable points A1 and A2 on the fuel efficiency characteristics map of FIG. 6, is a speed at which favorable fuel efficiency will be maintained.

The route F that the operating point of the engine 7 follows at this time is determined by a ratio between the rate of change of the target engine speed and the rate of change of the target torque. Therefore, a ratio between the limit value for the rate of change of the target engine speed and the limit value for the rate of change of the target engine speed is predetermined in the rate limiters 11b2, 11c2 to ensure that the operating point of the engine 7 moves along the route F, defined as the dotted line between fuel-efficiently favorable points A1 and A2 on the fuel efficiency characteristics map of FIG. 6, that is, that the engine speed and the engine torque vary along the route F. In addition, the relationship between fuel efficiency and the speed at which the operating point of the engine 7 moves (i.e., the rates of change of the engine speed and torque), is established in advance and the limit value for the rate of change of the target engine speed and the limit value for the rate of change of the target engine torque are predetermined to maintain favorable fuel efficiency at the moving speed of the operating point, that is, control the rates of change of the engine speed and torque to fall within the fuel-efficiently favorable range. These limit values are set in the rate limiters 11b2, 11c2 beforehand.

FIG. 8B is a diagram similar to FIG. 8A, showing another example of the engine torque setter 11c. In this example, the engine torque setter 11c includes a target torque map 11c1A and the rate limiter 11c2. The target torque map 11c1A describes the relationship between the requested engine output and the target torque of the engine 7 so that the target speed N and target torque T of the engine 7 are set on the route F defined as the dotted line between fuel-efficiently favorable points A1 and A2 on the fuel efficiency characteristics map of FIG. 6. A most fuel-efficiently favorable target torque is output according to the requested engine output.

Referring to FIG. 8A, finding the target torque using the target engine speed map 11b1 and the divider 11c1 is equivalent to providing the target torque map 11c1A as shown in FIG. 8B and deriving from the target torque map 11c1A a most fuel-efficiently favorable output torque for the requested engine 7 output power. The target engine 7 speed may instead be derived by providing target torque map 11c1A and the divider 11c1 and dividing the requested engine output power by the target torque.

In other words, the target engine speed map 11b1 in FIG. 8A and the target engine speed map 11b1 and target torque map 11c1A in FIG. 8B are an arithmetic map that describes the above route F (the route F denoted by the dotted line between fuel-efficiently favorable points A1 and A2) in associated form with respect to at least one of the relationship between the requested engine 7 output and the target rotational speed of the engine 7 and the relationship between the requested engine 7 output and the target torque of the engine 7. The arithmetic map refers to the requested engine output value corresponding to the work load of the hydraulic excavator (the hydraulic work machine), and computes at least one of the target speed and the target torque of the engine 7.

In the present embodiment of the configuration described above, when the operating point of the engine 7 is to be moved by changing the rotational speed and torque of the engine 7, the route F denoted by the dotted line between fuel-efficiently favorable points A1 and A2 can be set and a moving speed that maintains favorable fuel efficiency can be set as the moving speed of the operating point. The operating point can therefore be prevented from passing through a fuel-efficiently unfavorable region or from moving too fast to maintain favorable fuel efficiency. The combustion state of the engine 7 under the transient state that the engine changes in speed and torque can also be improved.

(Second Embodiment)

Figure 9:
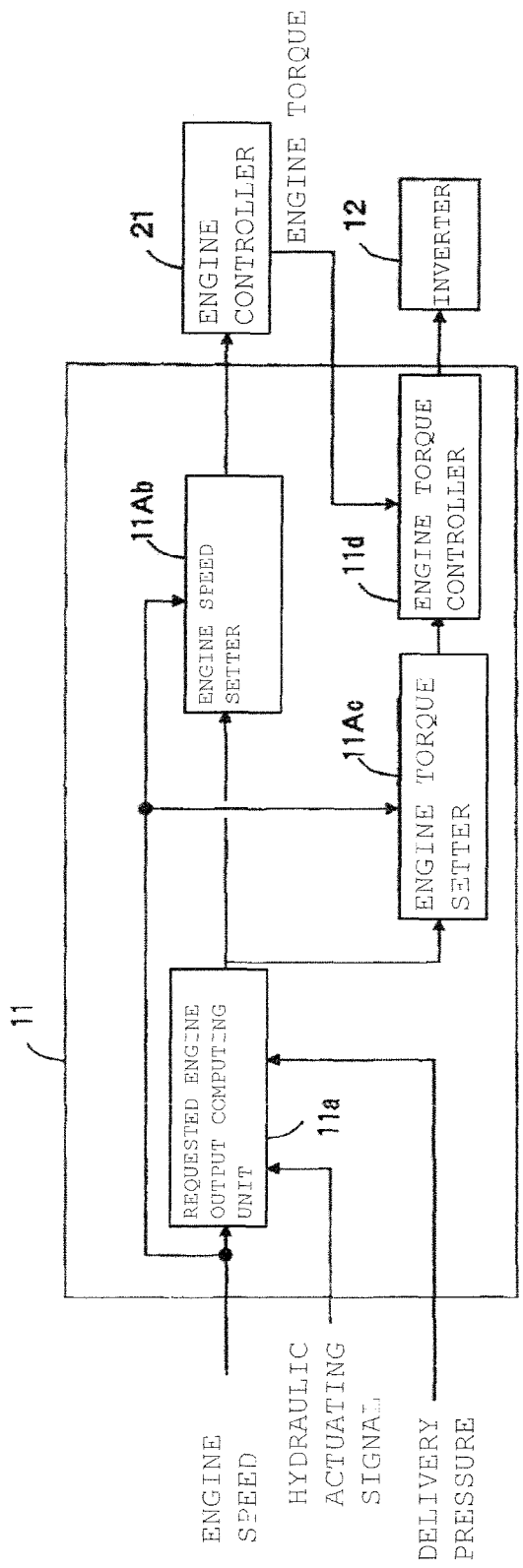
FIG. 9 is a functional block diagram that shows details of engine speed and torque control processing by a vehicle body controller of an actuator driving system in a second embodiment of the present invention.

FIG. 9 is a functional block diagram that shows details of engine speed and torque control processing by a vehicle body controller 11 (see FIG. 2) of an actuator driving system in a second embodiment of the present invention. The vehicle body controller 11 includes a requested engine output computing unit 11a, an engine speed setter 11Ab, an engine torque setter 11Ac, and an engine torque controller 11d. The requested engine output computing unit 11a and the engine torque controller 11d are the same as those described in the first embodiment with reference to FIG. 3. The engine speed setter 11Ab computes a target rotational speed of an engine 7 from a rotational speed of the engine 7 and the engine 7 output requested. The engine torque setter 11Ac computes a target torque of the engine 7 from the requested engine 7 output and the engine 7 speed.

Figure 10:
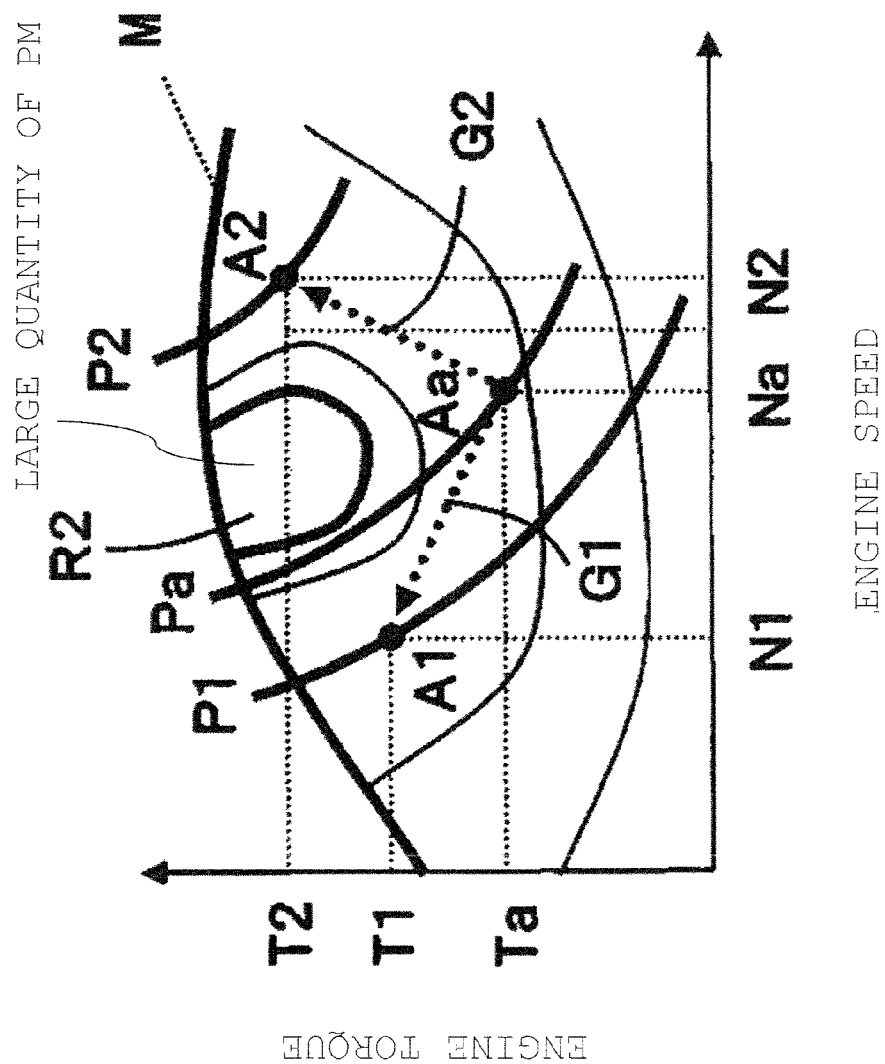
FIG. 10 is a map that shows PM emission characteristics of an engine with respect to a rotational speed and torque in the second embodiment of the present invention, the figure also being a conceptual diagram illustrating a related basic idea of the invention.

In the present embodiment, the requested engine output computing unit 11a, the engine speed setter 11Ab, and the engine torque setter 11Ac constitute an engine speed and torque setting device that sets the target speed and target torque of the engine 7 so that in response to a change in a work load of a hydraulic excavator (hydraulic work machine), the engine 7 speed and torque will change along predetermined routes G1 and G2 for improved engine 7 internal combustion, defined in a running region of the engine 7 that is determined from the engine speed and torque (see FIG. 10 for the routes G1, G2). An engine controller 21 constitutes a first control device that controls the engine 7 so as to obtain the target engine speed set by the engine speed and torque setting device, and the engine torque control unit 11d constitutes a second control device that controls torque of an assist motor 10 so as to obtain the target torque set by the engine speed and torque setting device.

In addition, the engine speed setter 11Ab (the engine speed and torque setting device) limits respective rates of change of the target engine speed and torque so that when the work load of the hydraulic excavator (hydraulic work machine) changes, the target speed and target torque of the engine 7 will change at a rate lower than that at which an output of the hydraulic pump 6 will change according to the particular change in the work load of the hydraulic excavator, and so that the respective rates of change of the target engine 7 speed and torque are controlled to fall within a predetermined range for improved combustion in the engine 7.

In the present embodiment, the predetermined routes G1, G2 for improved combustion in the engine 7 are set allowing for fuel efficiency characteristics of the engine and in line with emission characteristics of air pollutants likely to be contained ire gas emissions from the engine 7. Thus, routes that suppress the degradation of fuel efficiency and reduce emission levels of the air pollutants (e.g., PM) in the gas emissions are set as the routes G1, G2 each denoted by a dotted line between points A1, Aa, and A2 in FIG. 10. In the present embodiment, predetermined limit values for the rate of change of the target engine speed and the rate of change of the target engine torque are also set allowing for the fuel efficiency characteristics of the engine 7 and in line with the emission characteristics of the air pollutants likely to be contained in the gas emissions from the engine 7. Accordingly, the respective rates of change of the target engine speed and torque are limited to fall within a predetermined range for suppressed degradation of fuel efficiency and reduced increases in the emission levels of the air pollutants (e.g., PM) in the gas emissions.

The engine speed setter 11Ab and the engine torque setter 11Ac are described in detail below with reference to FIGS. 10 to 12.

FIG. 10 is a map that shows the PM (particulate matter) emission characteristics of the engine 7 with respect to the rotational speed and torque thereof in the second embodiment of the present invention, the figure also being a conceptual diagram illustrating a related basic idea of the invention.

Referring to 10, a plurality of curves drawn in a running region internal to a maximum torque line M are lines representing the PM emission characteristics of the engine 7. In addition, an inner region of the PM emission characteristics lines that is assigned reference symbol R2 is a region prone particularly to PM emissions, and the routes G1, G2 denoted the dotted lines between points A1, Aa, and A2 all keeping away from the region R2 are the routes that suppress the degradation of fuel efficiency and reduce the emission levels of the air pollutants in the gas emissions. The routes G1, G2 are determined allowing for the fuel efficiency characteristics of the engine 7 and in line with the emission characteristics of the air pollutants likely to be contained in the gas emissions from the engine 7.

The diesel engine 7 emits large amounts of PM nearly at maximum torque. As in the fuel efficiency characteristics map of FIG. 6, swing operations and other work relatively light in load require the engine output denoted by P1, and excavation and other work relatively heavy in load require the engine output denoted by P2. As described with reference to FIG. 6, for enhanced fuel efficiency of the engine is desirably run at position A1 of an operating point so as to perform the work requiring the output power P1, and at position A2 of the operating point so as to perform the work requiring the output power P2. However, if as shown in FIG. 6, the operating point is set to move from A1 to A2 on a linear route F with importance attached to fuel efficiency, the operating point might pass through the region R2 in which PM will be emitted in large amounts. Accordingly the target speed and target torque of the engine 7 are set so that under steady-state operation, importance is attached to fuel efficiency, and that at least under transient operation during movements of an operating point of the engine in the present embodiment), the operating point is kept away from the PM-emission-prone region R2 while consideration is being paid to fuel efficiency. To this end, instead of the engine speed and torque being changed linearly from A1 to A2, the operating point is caused to temporarily pass through position Aa between P1 and P2 on output power curve Pa, in which case, position Aa is where a relatively small amount of PM will be emitted. That is to say, the engine speed is increased from N1 to Na and N2, and torque is reduced from T1 to Ta and then increased to T2.

Figure 11:
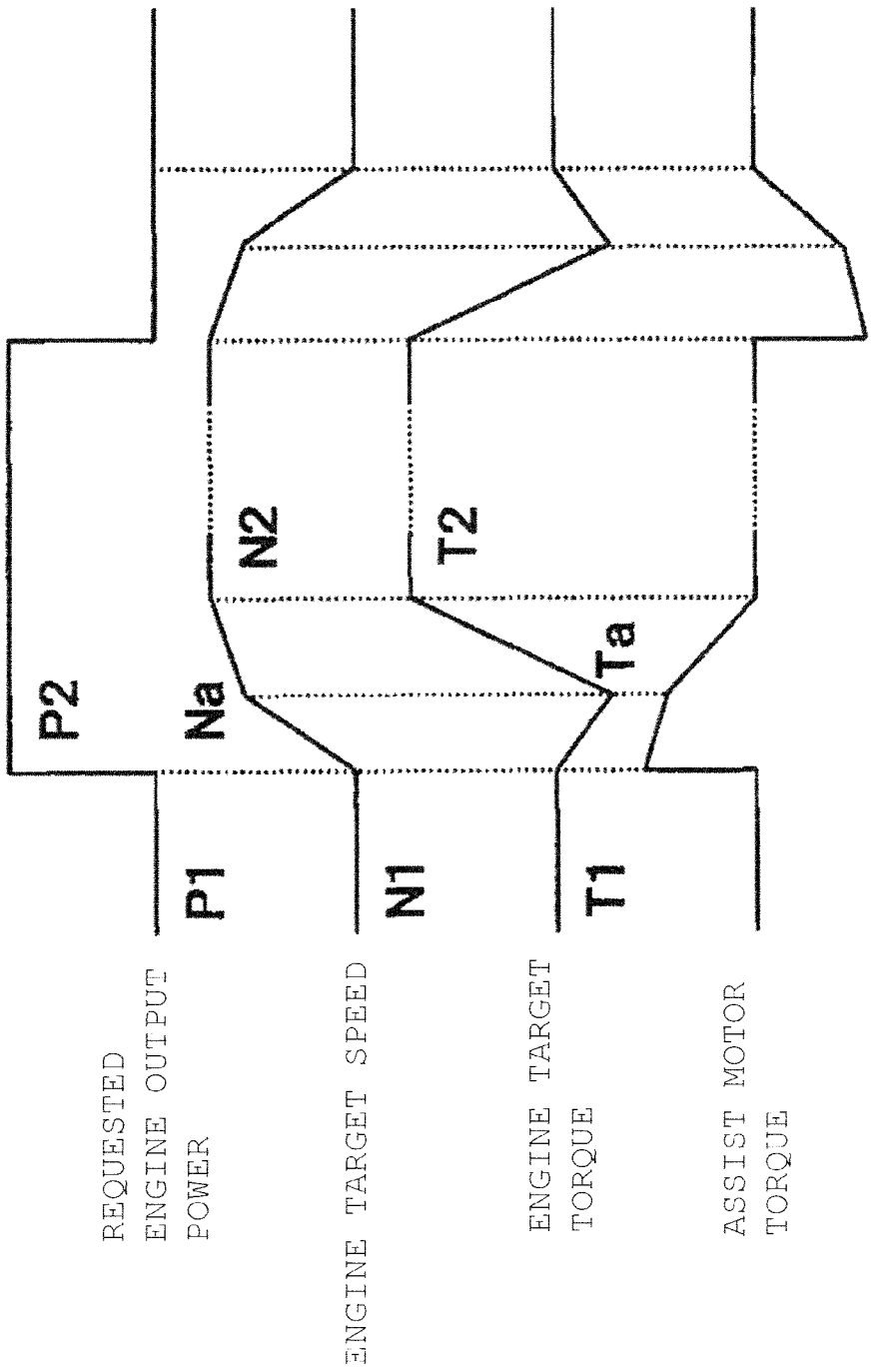
FIG. 11 is a timing chart that represents operation relating to movements of an operating point in FIG. 10.

FIG. 11 is a timing chart that represents the operation relating to the movements of the operating point in FIG. 10. First, suppose that the output required for the engine 7 increases stepwise from P1 to P2. To move the operating point from A1 to Aa and then from Aa to A2, the target engine speed is increased from N1 to Na and the target engine torque is reduced from T1 to Ta. After the engine speed has reached Na, the target engine speed is further increased from Na to N2 and at the same time, the target engine torque is increased from Ta to T2. If the rotational speed and torque of the engine change in line with their target values, the output of the engine 7 increases monotonously, which in turn reduces a torque of the assist motor 10 with time and then upon the operating point reaching A2, further reduces the assist motor torque to zero. Substantially a right half of the timing chart shows a case in which the requested engine output power decreases from P2 to P1. In this case, in order to move the operating point from A2 to Aa and then from Aa to A1, the target engine speed is reduced from N2 to Na and the target engine torque is significantly reduced from T2 to Ta. After the engine speed has reached Na, the target engine speed is further reduced from Na to N1 and at the same time, the target engine torque is increased from Ta to T1.

Figure 12:
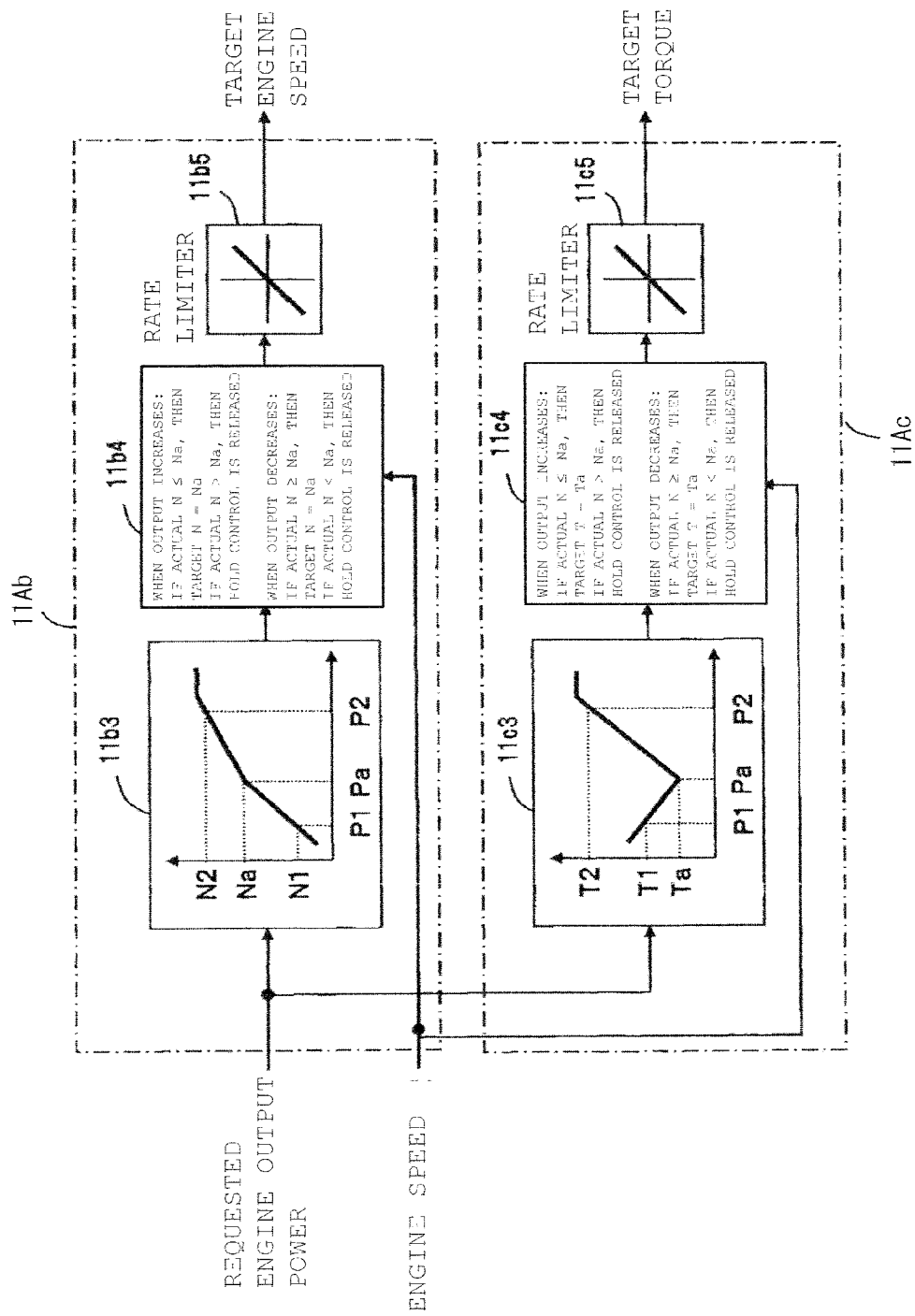
FIG. 12 is a block diagram that shows details of processing in an engine speed setter and an engine torque setter.

FIG. 12 is a block diagram that shows details of processing in the engine speed setter 11Ab and the engine torque setter 11Ac.

The engine speed setter 11Ab includes a target engine speed map 11b3, an intermediate-data holder 11b4, and a rate limiter 11b5, and the engine torque setter 11Ac includes a target torque map 11c3, an intermediate-data holder 11c4, and a rate limiter 11c5.

The target engine speed map 11b3 describes the relationship between the requested engine output and the target speed of the engine 7 so that the target engine speed N and the target torque T are set on the routes G1 G2 each defined as the dotted line between points A1 and A2, on the PM emission characteristics map of FIG. 10, in which case, points A1 and A2 both allow for the enhancement of fuel efficiency and keep away from the PM-emission-prone region R2. The engine speed allowing for favorable fuel efficiency and minimum PM emissions is output according to the requested output of the engine 7. Similarly, the target engine torque map 11c3 describes the relationship between the requested output and the target torque of the engine 7 so that the target speed N and the target torque T are set on the routes G1, G2 each defined as the dotted line between points A1 and A2, on the PM emission characteristics map of FIG. 10, in which case, points A1 and A2 both allow for the enhancement of fuel efficiency and keep away from the PM-emission-prone region R2. The torque allowing for favorable fuel efficiency and minimum PM emissions is output according to the requested output of the engine 7.

The intermediate-data holders 11b4 and 11c4 are configured so that when the requested engine 7 output undergoes a rapid change between P1 and P2, until an actual rotational speed of the engine 7 reaches Na, the intermediate-data holders will maintain the target speed and target torque of the engine at Na and Ta, respectively, to ensure that the operating point will pass through point Aa. For example, the intermediate-data holders 11b4 and 11c4 are configured so that when the requested engine output undergoes an abrupt change (increase) between P1 and P2 as shown in FIG. 11, until the actual rotational speed of the engine reaches Na, the intermediate-data holders will output Na as the target engine speed and Ta as the target torque, and so that once the actual rotational speed of the engine has reached Na, the holder will release hold control of Na and output N2 as a new target engine speed and T2 as a new target torque.

The rate limiters 11b5 and 11c5, as with the rate limiters 11b2 and 11c2 in the first embodiment, are configured so that when the requested engine output changes abruptly, they limit the rates of change of the target engine speed and the target torque and outputs the target engine speed and the target torque.

More specifically, when the requested engine output undergoes an abrupt change, the rate limiter 11b5 suppresses the rate of change of the target engine speed to the predetermined limit value or less and then outputs the target engine speed to the engine controller 21. The rate limiter 11c5 coordinates with the intermediate-data holder 11c4 to suppress the rate of change of the target torque to the predetermined limit value or less and output the target torque to the engine controller 21.

The limit values to which the rate limiters 11b5 and 11c5 limit the rates of change are predetermined to ensure that the operating point represented by the target engine speed and torque (hereinafter, this operating point is referred to simply as the operating point of the engine 7) moves along the routes G1, G2, defined as the dotted lines between points A1, Aa, and A2 in FIG. 10, at the speed where the degradation of fuel efficiency will be suppressed and the emission levels of the air pollutants in gas will be Kept low.

That is to say, the routes that the operating point of the engine 7 follows are dictated by a ratio between the rate of change of the target engine speed and the rate of change of the target engine torque. Therefore, a ratio between the limit value for the rate of change of the target engine speed and the limit value for the rate of change of the target engine torque, is predetermined in the rate limiters 11$b$2, 11$c$2 to ensure that the operating point of the engine 7 moves along the routes G1, G2, defined as the dotted lines between points A1, Aa, and A2 that keep away from the PM-emission-prone region R2 allowing for enhanced fuel efficiency and in line with the PM emission characteristics map of FIG. 10. In addition, the relationship between the moving speed of the operating point of the engine 7 (i.e., the rates of change of the engine speed and torque), fuel efficiency, and PM emission levels, is established beforehand and the limit values for the rates of change of the target engine speed and the target torque are predetermined in accordance with the above relationship to suppress both of the degradation of fuel efficiency and increase of the PM emission at the moving speed of the operating point. These limit values are set in the rate limiters 11$b$5 and 11$c$5 beforehand. Thus the operating point of the engine 7 moves at the speed where the degradation of fuel efficiency will be suppressed and the emission level of PM will be kept low, and without deviating from the routes G1, G2 defined as the dotted lines between points A1, Aa, and A2 in FIG. 10 for suppressed fuel efficiency and reduced emission levels of the air pollutants in gas emissions.

In the present embodiment of the configuration described above, when the operating point of the engine 7 is to be moved by changing the rotational speed and torque of the engine 7, the routes G1, G2 that suppress fuel efficiency and reduce the emission levels of the air pollutants in gas emissions can be set as the routes for the operating point of the engine 7, and a speed that suppresses fuel efficiency and reduces the emission levels of the air pollutants in gas emissions can be set as the moving speed of the operating point. While suppressing the degradation of fuel efficiency during movement, therefore, the operating point can be prevented from passing through the PM-emission-prone region R2 or from moving too fast to maintain a low PM emission level. The combustion state of the engine 7 under the transient state that the engine changes in speed and torque can also be improved.

While the embodiments of the present invention that apply a hydraulic excavator have been described above, substantially the same advantageous effects as those described above can be obtained by applying the invention to practically any other hydraulic work machine, such as a hydraulic crane, wheeled excavator, wheel loader, or other construction machine, that includes an electric assist motor coupled to an engine and a hydraulic pump.

DESCRIPTION OF REFERENCE NUMBERS AND SYMBOLS

3$a$: Boom cylinder
3$b$: Arm cylinder
3$c$: Bucket cylinder
3$e$, 3$f$: Left and right traveling motors
4$a$, 4$b$: Control lever devices
5$a$-5$c$, 5$e$, 5$f$: Directional control valves
6: Hydraulic pump
6$a$: Regulator
7: Engine
7$a$: Electronic governor
8: Relief valve
9: Tank
10: Assist motor
11: Vehicle body controller
11$a$: Requested engine output computing unit
11$b$, 11Ab: Engine speed setters
11$c$, 11Ac: Engine torque setters
11$d$: Engine torque controller
11$a$1, 11$a$2, 11$a$7: Maps
11$a$3: Minimum value selector
11$a$4, 11$a$5: Multipliers
11$a$6: Divider
11$d$1: P-controller
11$d$2: PI-controller
11$d$3 Subtractor
11$d$3: Subtractor
11$d$4: Adder
11$b$1: Map
11$c$1: Divider
11$c$1A: Map
11$b$2, 11$c$2: Rate limiters
11$b$3, 11$c$3: Maps
11$b$4, 11$c$4: Intermediate-data holders
11$b$5, 11$c$5: rate limiters
12, 13: Inverters
14: Chopper
15: Battery
16: Swing motor
17, 18: Pressure sensors
19: Pressure sensor
21: Engine controller
23: Speed sensor
25: Shuttle valve block
26: Pressure sensor
R1: Fuel-efficiently favorable region
R2: Region prone particularly to PM emissions
F: Fuel-efficiently favorable route
G1, G2: Routes that suppress degradation of fuel efficiency and reduce emission levels of air pollutants gas emissions

The invention claimed is:

1. A hybrid-driven hydraulic work machine, comprising:
an engine;
a hydraulic pump rotationally driven by the engine;
an electric assist motor coupled to the engine and the hydraulic pump;
a plurality of actuators each driven by a hydraulic fluid delivered from the hydraulic pump; and
a plurality of operating devices each including an operating member and configured to output an appropriate operating signal according to a particular operation of the operating member, thereby operating the actuators,
wherein the hydraulic work machine comprises:
an engine speed and torque setter that sets a target rotational speed and target torque for the engine so that in response to a change in a work load of the hydraulic work machine, an operating point of the engine moves along a route defined in a running region of the engine that is determined from the rotational speed and torque of the engine, the route being formed by connecting a plurality of points in a region which yields a favorable combustion state of the engine;
an engine controller that controls the engine so as to yield the target engine speed set by the engine speed and torque setter; and an engine torque control unit that controls torque of the assist motor so as to yield the target torque set by the engine speed and torque setter, wherein the engine speed and torque setter includes:

an engine speed setter that, in response to the change in the work load of the hydraulic work machine, computes the target rotational speed and target torque of the engine as values present on the route and that limits respective rates of change of the target rotational speed and target torque of the engine so that when the work load of the hydraulic work machine changes, the operating point of the engine moves along the route, and so that respective rates of change of the rotational speed and torque of the engine are controlled to fall within a predetermined range for yielding the favorable combustion state of the engine, wherein the engine speed setter includes: a first rate limiter that suppresses the rate of change of the target engine speed, to a predetermined limit value or less; and a second rate limiter that suppresses the rate of change of the target engine torque, to a predetermined limit value or less, and wherein a ratio between the predetermined limit value for the rate of change of the target engine speed and the predetermined limit value for the rate of change of the target engine torque is set so that the operating point of the engine moves along the route.

2. The hybrid-driven hydraulic work machine according to claim 1, wherein the engine speed and torque setter is further configured to limit respective rates of change of the target rotational speed and target torque of the engine so that when the work load of the hydraulic work machine changes, the target rotational speed and target torque of the engine will change at a rate lower than a rate at which an output of the hydraulic pump changes in response to the work load of the hydraulic work machine, and so that respective rates of change of the rotational speed and torque of the engine are controlled to fall within a predetermined range for yielding the favorable combustion state of the engine.

3. The hybrid-driven hydraulic work machine according to claim 1, wherein the engine speed setter includes an arithmetic map configured to: describe the route in associated form with respect to at least one of a relationship between the engine output requested and the target rotational speed of the engine and a relationship between the engine output requested and the target torque of the engine; and compute at least one of the target rotational speed and target torque of the engine with reference to the requested engine output corresponding to the work load of the hydraulic work machine.

4. The hybrid-driven hydraulic work machine according to claim 1, wherein the predetermined limit value for the rate of change of the target engine speed and the predetermined limit value for the rate of change of the target engine torque are set so that the respective rates of change of the rotational speed and torque of the engine are controlled to fall within the predetermined range for yielding the favorable combustion of the engine.

5. The hybrid-driven hydraulic work machine according to claim 4, wherein:

the limit value for the rate of change of the target engine speed and the limit value for the rate of change of the target engine torque are each at least one of a value determined in accordance with fuel efficiency characteristics of the engine, and a value determined allowing for the fuel efficiency characteristics of the engine and in accordance with emission characteristics of air pollutants contained in gas emissions from the engine.

6. The hybrid-driven hydraulic work machine according to claim 1, wherein: the route is either a route determined in accordance with fuel efficiency characteristics of the engine, or a route determined allowing for the fuel efficiency characteristics of the engine and in accordance with emission characteristics of air pollutants contained in gas emissions from the engine.

7. The hybrid-driven hydraulic work machine according claim 1, wherein: the limit value for the rate of change of the target engine speed and the limit value for the rate of change of the target engine torque are each at least one of a value determined in accordance with fuel efficiency characteristics of the engine, and a value determined allowing for the fuel efficiency characteristics of the engine and in accordance with emission characteristics of air pollutants contained in gas emissions from the engine.

* * * * *